United States Patent [19]

Supcoe et al.

[11] Patent Number: 5,521,242

[45] Date of Patent: May 28, 1996

[54] HIGH CONCENTRATION SLURRY-FORMULATION AND APPLICATION

[75] Inventors: Robert F. Supcoe; Allan P. Evans, both of Annapolis, Md.

[73] Assignee: The United States of America as represented by the Secretary of the Navy, Washington, D.C.

[21] Appl. No.: 184,995

[22] Filed: Sep. 30, 1971

[51] Int. Cl.$^6$ ............................. C08K 5/06; C08K 3/34
[52] U.S. Cl. ................. 524/376; 524/377; 524/306; 524/446; 114/20.1; 114/67 R; 137/13; 252/315.2
[58] Field of Search ................................. 114/20.1, 67 R; 524/376, 377, 306, 446

[56] References Cited

U.S. PATENT DOCUMENTS 5,045,588  9/1991  Arranaga ........................... 114/67 R

*Primary Examiner*—Shean C. Wu

[57] ABSTRACT

A concentrated slurry comprises a high molecular weight polymer, a carrier, a wetting agent, and dispersant. The slurry is characterized by its ability to reduce turbulent flow and skin friction thereby reducing drag of a vessel when the slurry is mixed with water and dispersed in a thin sheet along the surface of a vessel.

5 Claims, 1 Drawing Sheet

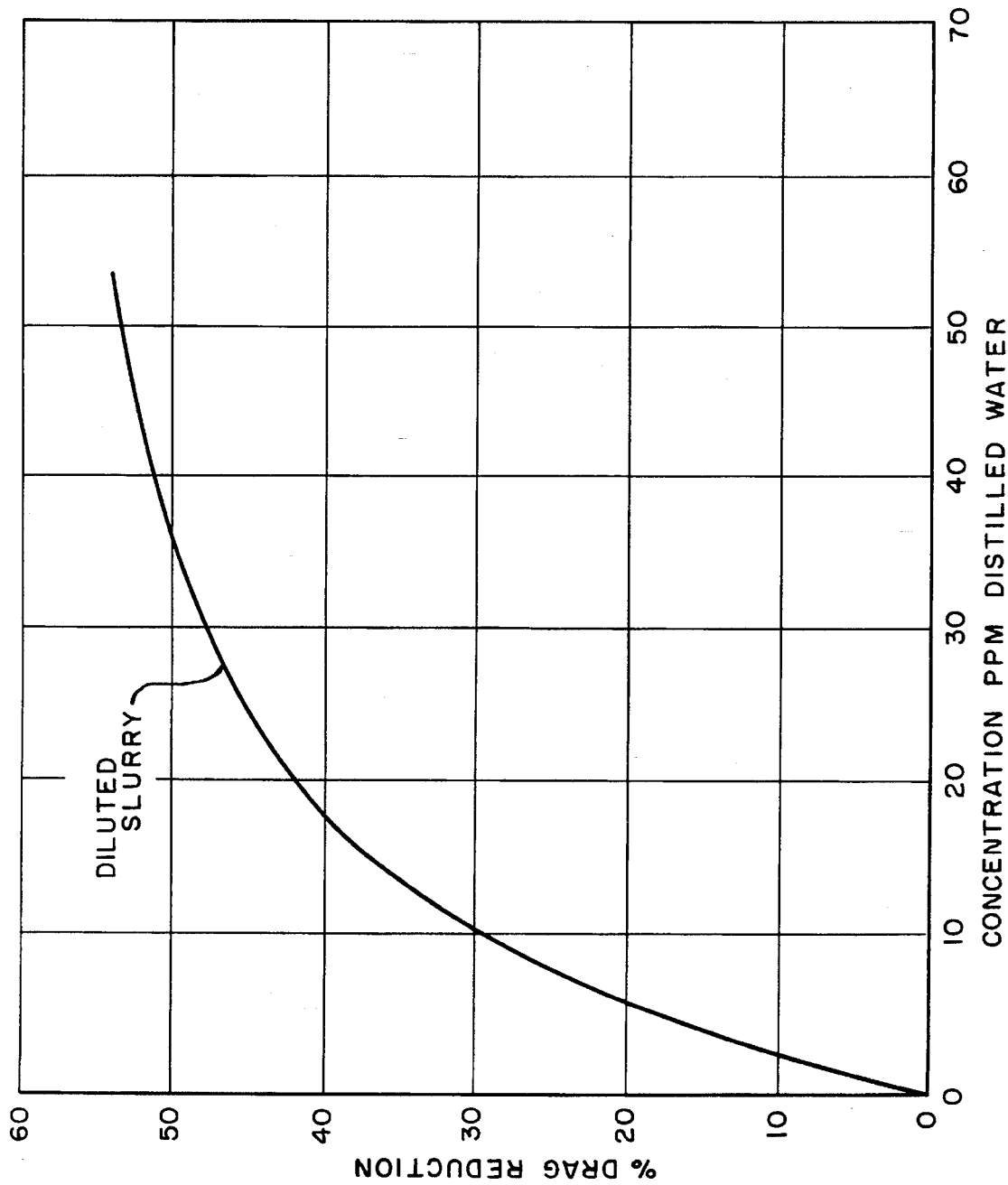

HIGH CONCENTRATION SLURRY-FORMULATION AND APPLICATION

The invention described herein may be manufactured and used by or for the Government of the United States of America for governmental purposes without the payment of any royalties thereon or therefor.

BACKGROUND OF THE INVENTION

The efficiency of a vessel through a fluid medium, such as a boat through water, is inversely related to the rate of fluid flow. Highest efficiencies are attained where the boundary layer is laminar, efficiency and speed being known to deteriorate when the boundary layer ceases to be laminar and becomes turbulent.

A great many attempts to solve this problem have utilized specialized shaping of the vehicle structure such as slots and circulation control jets. In addition, various attempts have been made to reduce drag by the addition of a high molecular weight polymer. However, no polymer has been developed which is capable of attaining the drag reduction efficiencies of this invention.

SUMMARY

The slurry mix comprises a high molecular weight polymer such as polyacrylamide of a high molecular weight ranging from 1 to 15 million, a surfactant, a carrier such a polyhydric alcohol and a dispersing agent such as polarized montmorillonite clay.

This resulting mixture possesses a high polymer to carrier weight ratio with a viscosity such that the mixture which can be moved readily through piping and fittings without plugging. The mixture is maintained in a vessel in a concentration of 30%–54% and is dispersed by admitting seawater under low pressure. The concentrated slurry is then moved along piping under metered flow conditions to a mixing vessel and there is hydrated with seawater to a lower concentration. The lower concentration is then passed to ejector rings located on the skin surface in areas of potential turbulent flow. Expulsion of the slurry through the rings and along the surface of the vessel maintains the boundary layer flow laminar and prevents flow transition from laminar to turbulent. The vessel can thereby maintain speed and efficiency in its movement through the fluid.

Among the advantages of the slurry is its storage capability. It can be stored for a period of time in conventional storage tanks aboard a surface or undersea craft and dispersed as needed. Tanks can then be refilled by pumping new material into the storage tanks.

DESCRIPTION OF THE DRAWING

The Figure shows the percent drag reduction attained with the slurry.

DESCRIPTION OF THE INVENTION

The slurry is comprised of four basic groups of materials in the ranges as listed below.

| Group A) | high molecular weight polymer | 30–54% |
|---|---|---|
| Group B) | carrier | 48–64% |
| Group C) | wetting agent | 0.2–1% |
| Group D) | dispersant | 1.3–5% |

A. High molecular weight polymer. Any high molecular weight polymer having a weight in the range of 1 to 15 million and water soluble may be used in the range of 30 to 54%. A polymer such as a polyacrylamide may be used.

B. Carrier. Carrier liquid which may be used together with the high molecular weight polymer are propylene carbonate, tetrahydrofuryl alcohol, methoxytriglycol, polypropylene glycol with a molecular weight of 425, butoxy ethoxytriglycol, 1-butoxyethoxy-2-propanol, ethyleneglycol diacetate and triacetin.

C. Wetting agent. A surfactant having a high molecular weight may be satisfactorily used within the slurry. Such surfactants are: hydrocarbon oxide, salts of high molecular weight alcohols and alkyl phenyl hydroxy polyoxyethylene.

D. A dispersant. Dispersents which are organic derivatives of montmorillonite clay (Bentone 27,38) or funed silica such as Gabosil M5 or H5 may be used.

A typical 40% slurry system is composed of 40% of a high molecular weight polymer, 55.40% polyhydric alcohol, 2.63% of a 22 carbon fatty amide and 1.3% of polorized montmorillonite clay.

The solid material is ballmilled until a particle size of 44.5 microns is attained, equivalent to a rating greater than 4.5 on the Hegeman scale.

In mixing, the dispersant and surfactant are mixed together with the carrier and mixed at high speed until a gel develops. The resin is then added in increments and homogenized.

The slurry may be stored until ready to use. In the case of storage in a vessel the slurry may be displaced by admitting low pressure seawater to the slurry tank. The slurry subjected to this low pressure is fed through a mixing chamber where it is diluted to a low concentration suitable for its intended use. The slurry may be ejected by a number of different methods, a suitable method being through a series of ports shaped so that the slurry is ejected in a thin sheet along the surface of a vessel.

Referring now to the Figure, the effectiveness of the slurry in reducing drag is shown with various concentrations of the slurry. The slurry represented in the Figure is composed of 39.7% high molecular weight polymer, 56.2% polyhydric alcohol, 2.63% 22 carbon fatty amide, and 1.3% of polorized montmorillonite clay. The slurry may be prepared by combining 750 grams of resin to 732 grams of carrier with 8.0 grams of surfactant and 10 grams of dispersant (7.0 gms of Gabosil and 3.0 gms of Bentone).

For a concentration of 10 ppm of slurry to seawater, the percent of drag reduction realized in tests was 30%. The effectiveness of the slurry is most pronounced in the range between 1 and 10 parts per million with ratio of drag reduction to concentration being $$\frac{3\%}{\text{ppm}},$$

linearly approximated from the curve shown in the Figure.

Obviously many modifications and variations of the present invention are possible in the light of the above teachings. It is therefore to be understood that within the scope of the appended claims the invention may be practiced otherwise than as specifically described.

What is claimed is:

1. A slurry for expulsion in a thin sheet along the skin surface of a vehicle moving through a fluid to maintain a laminar boundary layer flow condition comprising:

a polyacrylamide polymer which is water soluble and has a molecular weight within the range of 1 to 15 million in the range of 30–54%;

a carrier in the range of 48–64%, wherein said carrier is a material selected from the group consisting of propylene carbonate, tetrahydrofuryl alcohol, poly-propylene glycol with a molecular weight of 425, butoxy ethoxytriglycol, 1-butoxyethoxy-2-propanol, ethyleneglycol diacetate, triacetin, and methoxytriglycol;

a wetting agent in the range of 0.2–1% ; and a dispersant in the range of 1.3–5%.

2. A composition of the slurry of claim 1 and water wherein:

said slurry of claim 1 is diluted with water to a concentration ranging from 1 ppm to 50 ppm.

3. A composition consisting essentially of water and from 1 ppm to 10 ppm of the slurry of claim 1;

said composition having a drag reducing capability expressed by the relationship $$\frac{3\%}{1\ ppm}$$

drag reduction within this range.

4. The slurry of claim 1 wherein:

said wetting agent is a material selected from the group consisting of hydrocarbon oxide, salts of high molecular weight alcohols and alkyl phenyl hydroxy polyoxethylene.

5. The slurry of claim 4 wherein:

said dispersant is a material selected from the group consisting of an organic derivative of montmorillonite clay and fumed silica.

\* \* \* \* \*